(12) United States Patent
Nakatani

(10) Patent No.: US 11,902,363 B2
(45) Date of Patent: Feb. 13, 2024

(54) LOAD DISTRIBUTION METHOD, LOAD DISTRIBUTION DEVICE, LOAD DISTRIBUTION SYSTEM AND PROGRAM

(71) Applicant: Nippon Telegraph and Telephone Corporation, Tokyo (JP)

(72) Inventor: Yuichi Nakatani, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/016,047

(22) PCT Filed: Jul. 20, 2020

(86) PCT No.: PCT/JP2020/028143
§ 371 (c)(1),
(2) Date: Jan. 13, 2023

(87) PCT Pub. No.: WO2022/018808
PCT Pub. Date: Jan. 27, 2022

(65) Prior Publication Data
US 2023/0275958 A1    Aug. 31, 2023

(51) Int. Cl.
*H04L 67/1012*    (2022.01)

(52) U.S. Cl.
CPC .................. *H04L 67/1012* (2013.01)

(58) Field of Classification Search
CPC ............ H04L 67/1012; H04L 67/1001; H04L 67/1023; G06F 9/50
USPC ........................................................ 709/217
See application file for complete search history.

(56) References Cited

U.S. PATENT DOCUMENTS

| 2018/0289351 | A1* | 10/2018 | Dorn ...................... A61B 6/542 |
| 2020/0143262 | A1* | 5/2020 | Khare .................... G06N 20/00 |
| 2021/0173728 | A1* | 6/2021 | Treadway ............... G06F 9/547 |

FOREIGN PATENT DOCUMENTS

| JP | 2015154319 | 8/2015 |
| JP | 2015184744 | 10/2015 |

OTHER PUBLICATIONS

Irie et al., "A Load Balancing and Replica Partitioning Method for Consistent Hashing," IEICE Technical Report, 2010, 110(224):69-74, 13 pages (with English Translation).

* cited by examiner

*Primary Examiner* — Karen C Tang
(74) *Attorney, Agent, or Firm* — Fish & Richardson P.C.

(57) ABSTRACT

A server string management device (100) execute, a server string generation step S11 of generating a server permutation combination indicating a combination of servers in a predetermined constraint for a load balancing server, a permutation connection graph generation step S12 of generating a permutation connection graph in which the generated server permutation combination is connected as a node, a connection closed path extraction step S13 of extracting an Euler closed path passing through all the edges once with drawing a edge which passes a path connecting each node on the generated permutation connection graph, and a server string extraction step S14 of generating a server string in which servers at predetermined positions corresponding to each node are arranged along the generated Euler closed path.

7 Claims, 8 Drawing Sheets

LOAD DISTRIBUTION METHOD, LOAD DISTRIBUTION DEVICE, LOAD DISTRIBUTION SYSTEM AND PROGRAM

CROSS-REFERENCE TO RELATED APPLICATIONS

This application is a National Stage application under 35 U.S.C. § 371 of International Application No. PCT/JP2020/028143, having an International Filing Date of Jul. 20, 2020. The disclosure of the prior application is considered part of the disclosure of this application, and is incorporated by reference in its entirety into this application.

TECHNICAL FIELD

The present invention relates to a load balancing method, a load balancing device, a load balancing system, and a program in a stateful service or the like.

BACKGROUND ART

In a system for receiving a service request over a network, it is necessary to respond to a huge amount of service requests and to flexibly change the amount of hardware to be allocated in accordance with the amount of service requests, so that realization in a balancing system for operating a plurality of Web servers, DB servers, and the like in parallel is a main stream.

In order to realize the balancing system, a load balancing device is required for appropriately distributing service requests and DB operations to any of servers and equalizing server loads and storage data amounts among the servers. In many Web services, since individual service requests can be processed independently, a load balancing device for distributing the service requests in order or at random regardless of the contents of the service requests is used.

However, in the case where stateful Web service requires to share same information between a plurality of service requests such as SIP (Session Initiation Protocol) applications, data such as distributed hash table are distributed and stored, and a load balancing device itself is operated in parallel and session information is shared, or the like, it is necessary for a device itself to realize a load balancing device for distributing service requests, DB operations, and session information which are associated with others to the same server. In particular, in the distributed hash table, it is necessary to move the stored data in accordance with the increase or decrease of the server resources or the like, but this movement causes a large load to the network band and the storage area, so that it is required to reduce the amount of movement as much as possible.

A load balancing method in which a Consistent Hashing method for determining a data storage server in accordance with a hash value of a key is applied to a load balancing device is described in NPL 1. More specifically, a method of distributing to the same server as long as the same key is present in the service request, particularly a method of uniformly balancing the load while suppressing the number of slots of a slot group defining correspondence between a hash value and a distribution destination server is described.

PTL 1 describes a load balancing system which uniforms loads by structuring slot allocation.

CITATION LIST

Non Patent Literature

[NPL 1] Michio IRIE and 4 others, "A Load Balancing and Replica Partitioning Method for Consistent Hashing", the Institute of Electronics, Information and Communication Engineers, IEICE Technical Report IN2010-77

Patent Literature

[PTL 1] Japanese Patent Application Publication No. 2015-154319

SUMMARY OF INVENTION

Technical Problem

In the method of NPL 1, the influence of the number of slot groups and the increase or decrease of server resources can be suppressed, while the load is not uniform completely, and there is a possibility that a large load deviation occurs between servers. However, in the case of actually constructing a system, in a situation where the load is not sufficiently equalized and which server has a high load is not known, there is no selection but to select a device having sufficient performance when procurement of server hardware, and a result of raising the procurement cost is obtained, so that a method of not sufficiently guaranteeing the uniformity of the load is insufficient for system construction.

In the method of PTL 1, since the memory usage amount is increased when managing or generating slot allocation, the number of servers to be operated in parallel is suppressed.

The present invention has been made in view of such a background, and it is an object of the present invention to construct a system having no deviation of loads between servers with a low memory usage.

Solution to Problem

In order to solve the above-mentioned problem, the present invention is a load balancing method for performing a load balancing among a plurality of servers, the load balancing method including: a server permutation combination generation step of generating a server permutation combination indicating a combination of the servers in predetermined constraints for a load balancing server; a permutation connection step of generating a permutation connection graph in which the generated server permutation combination is connected as a node; a connection closed path extraction step of extracting an Euler closed path passing through all the edges once with drawing an edge which passes a path connecting each node in the generated permutation connection graph; and a server string extraction step of generating a server string in which servers located at predetermined positions corresponding to the respective nodes are arranged along the generated Euler closed path.

Advantageous Effects of Invention

According to the present invention, it is possible to construct a system having no deviation of loads between servers with a low memory usage.

DESCRIPTION OF EMBODIMENTS

Hereinafter, a load balancing method or the like in an embodiment for implementing the present invention (hereinafter called "the present embodiment") will be described with reference to the drawings.

Embodiment

[Configuration of Load Balancing System]

Figure 1:
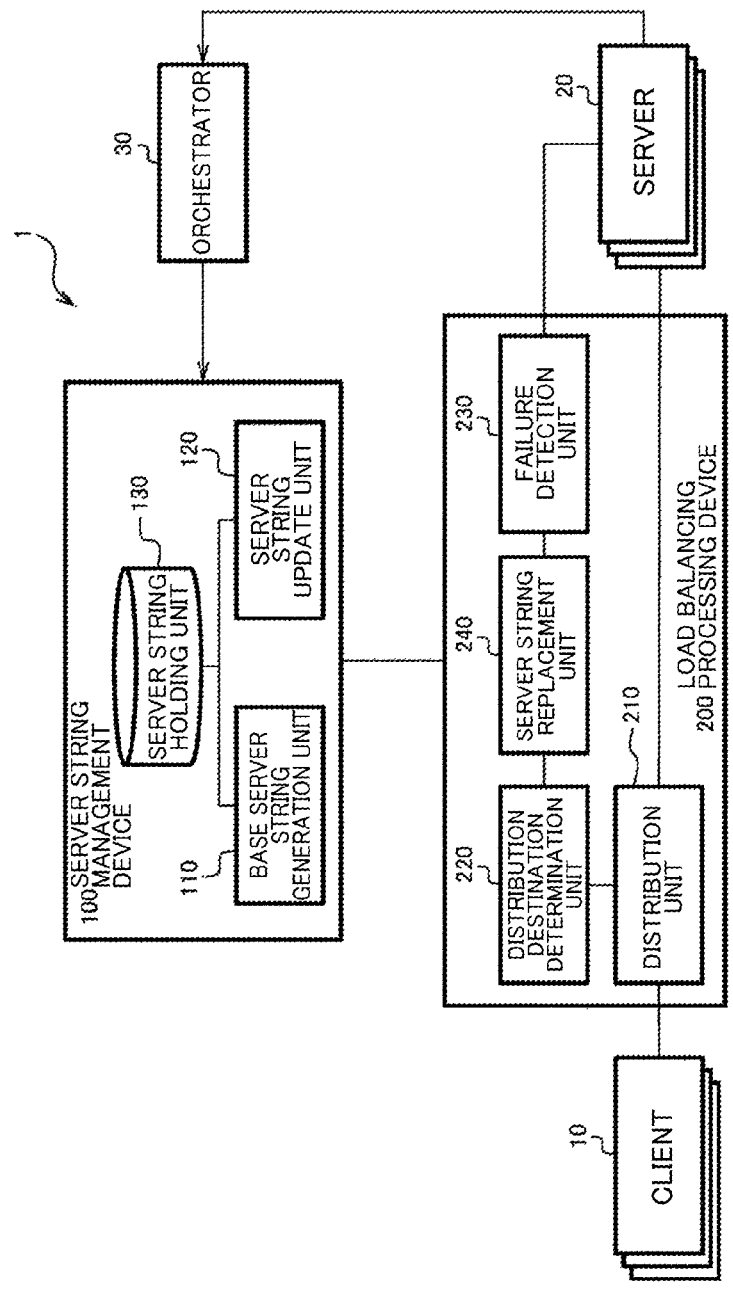
FIG. 1 is a diagram illustrating a load balancing system configuration according to an embodiment of the present invention.

FIG. 1 is a diagram illustrating a configuration of the load balancing system according to an embodiment of the present invention.

As shown in FIG. 1, the load balancing system 1 includes a server string management device 100 (load balancing device), a load balancing processing device 200, a client 10, a server 20 and an orchestrator 30, and which are connected by a network.

The client 10 is a DB client, and is a device for transmitting a request related to a DB operation such as put or get. In this case, the set of the load balancing processing device 200 and the server 20 behaves as if it is a database as an integrated system. The DB operation from the client 10 is exclusively received and distributed by the load balancing processing device 200, and the DB operation itself is executed by the server 20.

With this configuration, the client 10 may always face only the load balancing processing device 200 without being conscious of the increase or decrease of the server 20. However, if the same server 20 does not execute the update or reference processing for the data having the same key consistently, the consistency of the data is impaired or the data to be referred to does not exist at the beginning. Therefore, the distribution logic of the load balancing processing device 200 must distribute the data of the same key to the same server 20.

The orchestrator 30 grasps the unit number of servers 20 and the number and timing of the increase/decrease of the unit number of servers 20 and notifies the server string management device 100 of it.

The server string management device 100 generates and manages a server string for determining the allocation order of the slot group.

The server string management device 100 includes a base server string generation unit 110 for generating a base server string by using an assumed maximum number of servers which are allocated in advance, a server string update unit 120 for updating the server string according to a variation in the number of servers, and a server string holding unit 130 for storing the obtained server string (to be described later).

[Detail Configuration of Server String Management Device 100]

Figure 2:
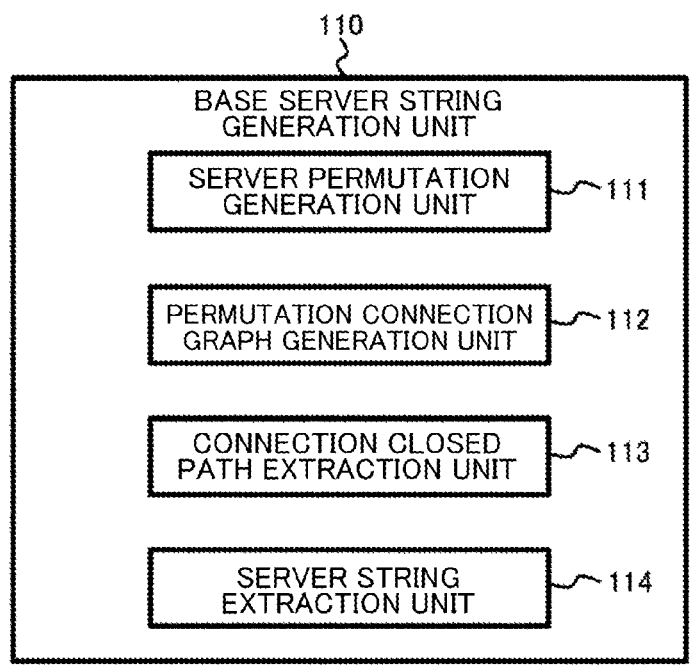
FIG. 2 is a detailed configuration illustrating a base server string generation unit in a server string management device of the load balancing system according to the embodiment of the present invention.

FIG. 2 is a detail configuration of a base server string generation unit 110 of the server string management device 100.

As shown in FIG. 2, the base server string generation unit 110 includes a server permutation generation unit 111, a permutation connection graph generation unit 112, a connection closed path extraction unit 113, and a server string extraction unit 114.

The server permutation generation unit 111 generates a server permutation combination indicating a combination of servers in a predetermined constraint for the servers to which load balancing is applied (to be described later). The predetermined constraint is that a partial string having a length obtained by adding 1 to the unit number of the assumed simultaneous failure number (referred to "assumed simultaneous failure number" below) is a permutation. Therefore, the server permutation generation unit 111 generates all the server permutation having a length obtained by adding 1 to the assumed simultaneous failure number.

Figure 4:
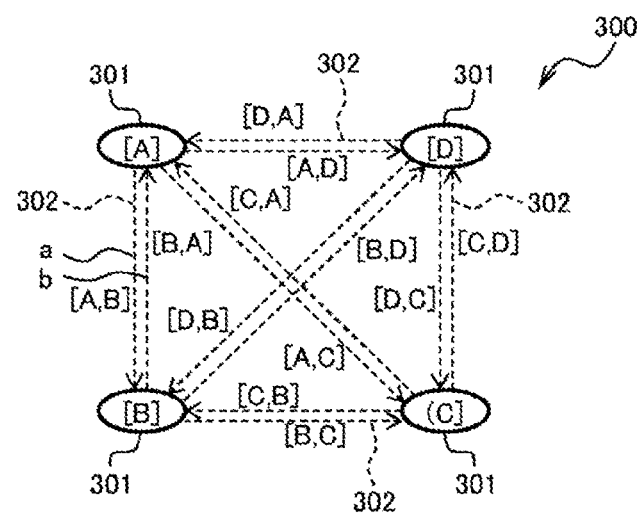
FIG. 4 is a diagram showing a permutation connection graph in which one server permutation is included in a node of the load balancing system according to the embodiment of the present invention.

For example, as shown in FIG. 4, which will be described later, the unit number of the assumed simultaneous failure number is assumed to be "1", and the server A, B, C, and D are considered. In this case, the server permutation generation unit 111, when enumerating all permutations of the length of "the unit number of assumed failure servers+1" for four servers, generates AB, AC, AD, BD, BC, BA, CA, CB, CD. That is, for example, when A fails, B takes over the processing, when A fails, C takes over the processing, when B fails, C takes over the processing, all the permutation combinations of the failure server and the server for taking over the processing of the failure server are enumerated. The permutation enumerated in this way is defined as a basic permutation.

The permutation connection graph generation unit 112 generates a permutation connection graph 300 (see FIG. 4 and FIG. 5) used for generation of a base server string, in which the server permutation combination generated by the server permutation generation unit 111 is connected as a node.

Figure 5:
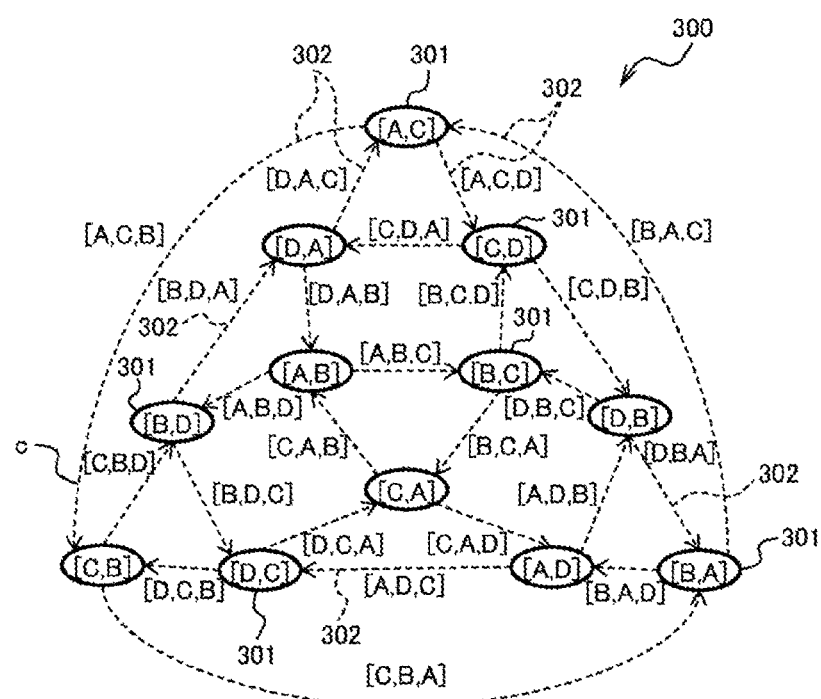
FIG. 5 is a diagram showing a permutation connection graph in which two server permutations are included in nodes of the load balancing system according to the embodiment of the present invention.

For example, the basic permutation is represented by AB, AC, BC, BA, CA, and CB, the permutation connection graph generation unit 112 generates a node having each basic permutation as a label, and extracts partial permutation excluding the first server for each basic permutation. For example, a node having a basic permutation as a label such as a basic permutation of AB, AC, BC, BA, CA, and CB is generated, a partial permutation of B excluding A which is a first server is extracted for AB, and a partial permutation of C is similarly extracted for AC. Such processing is performed for all the basic permutation. Then, the permutation connection graph generation unit 112 extracts a basic permutation starting from the extracted partial permutation. For example, BC and BA are extracted as basic permutations starting from the partial permutation B, and CA and CB are extracted as basic permutations starting from the partial permutation C. In this way, the permutation connection graph generation unit 112 extracts the basic permutation having the same server as the last end of the basic permutation at the top as the link destination of the graph. Then, the permutation connection graph generation unit 112 connects a node indicating the basic permutation to a node of a link destination extracted by the processing by a directed link (called appropriately "edge" blow), and generates a permutation connection graph 300 as shown in FIG. 5.

The connection closed path extraction unit 113 extracts an edge for passing a path connecting each node in the permutation connection graph 300 generated by the permutation connection graph generation unit 112, and extracts an Euler closed path 400 passing all the edges once (see FIG. 6) with drawing an edge which passes a path connecting nodes in the permutation connection graph 300 generated by the permutation connection graph generation unit 112.

The server string extraction unit 114 generates a server string (for example, a server string in which servers located at the head of permutation corresponding to respective nodes) are arranged as a server string.in which servers located at predetermined positions corresponding to respective nodes are arranged along an Euler closed path 400 on the permutation connection graph extracted by the connection closed path extraction unit 113 (to be described later).

The present invention is characterized in that a base server string generated by the load balancing method of the server string management device 100 (see FIG. 1) is distributed to the load balancing processing device 200.

[Configuration of the Load Balancing Processing Device 200]

The load balancing processing device 200 (see FIG. 1) distributes the distribution object transmitted from the client 10 to the server 20 by using the server string (base server string) distributed from the base server string generation unit 110 of the server string management device 100.

The load balancing processing device 200 includes a distribution unit 210 for performing distribution of objects, a distribution destination determination unit 220, a failure detection unit 230, a server string replacement unit 240.

The distribution unit 210 divides a predetermined hash space into slots having a length of the generated server string, generates a slot group in which servers are allocated to each of the divided slots in the order shown in the server string, and distributes received packets by using the generated slot group. The distribution unit 210 extracts a predetermined key from the received packet, and determines a server 20 of a transfer destination of the packet from comparison between the hash value and the slot group.

The distribution destination determination unit 220 determines a server 20 of a distribution destination on the basis of a key included in the distribution object.

The failure detection unit 230 detects a failure of the server 20.

The server string replacement unit 240 updates the server string on the basis of the detected failure of the server 20.

Although only one load balancing processing device 200 is described in FIG. 1, a plurality of load balancing processing devices 200 may be operated in parallel with the client 10 by using a load balancing devices or the like. Thus, more distribution processing can be realized, and more servers 20 can be accommodated.

The load balancing method of the load balancing system 1 constructed as described above will be described below.

As an example of the application service of the load balancing processing devices 200, the operation of each function will be described on the basis of the distributed hash table, but the application service of the present invention is not limited to this.

[Processing Operation of Server String Management Device 100]

First, the processing operation of the server string management device 100 will be described with reference to FIG. 1.

It is assumed that an orchestrator 30 capable of grasping the unit number of servers 20 and the number and timing of the increase/decrease of the unit number of servers 20 and notifying the server string management device 100 is present as a premise that the server string management device 100 operates.

Further, it is assumed that the assumed simultaneous failure number of the server 20 is set in advance, and in this embodiment, the assumed simultaneous failure number of the server 20 is 1.

The assumed simultaneous failure number is related to a range in which ideal load balancing is guaranteed in calculation, and even when a simultaneous failure number exceeding the above assumed simultaneous failure number occurs, the present invention can appropriately continue the load balancing.

When the server 20 is installed for the first time, the orchestrator 30 notifies the server string management device 100 of the active unit number of servers 20 to be installed and the maximum number of servers assumed thereafter.

The server string management device 100 receives the maximum unit number of servers and the unit number of active servers from the orchestrator 30. First, the base server string generation unit 110 (see FIG. 2) of the server string management device 100 generates a base server string which is a server string in the case where the maximum number of servers are accommodated. In the following examples, it is assumed that the maximum number of servers is "4" and the unit number of active servers is "3".

<Processing of Base Server String Generation Unit 110>

Figure 3:
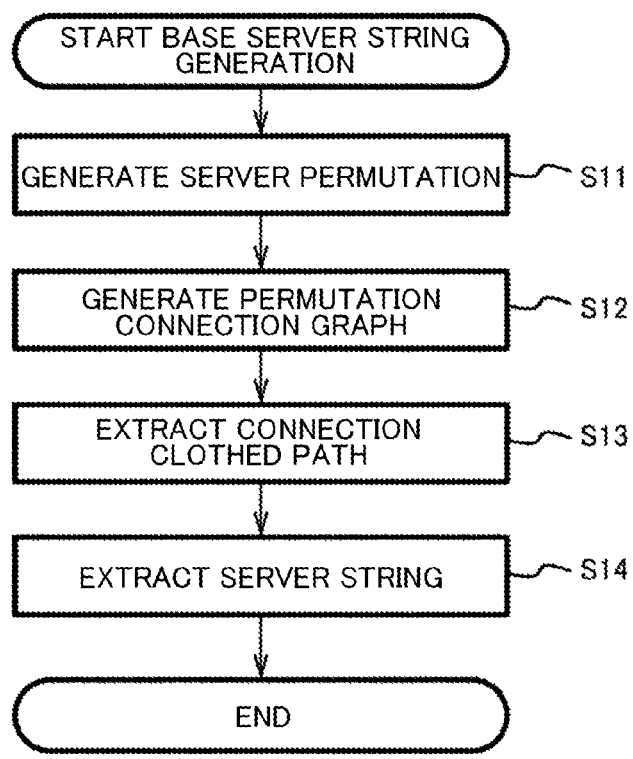
FIG. 3 is a flowchart showing generation of a base server string of the base server string generation unit in the load balancing system according to the embodiment of the present invention.

The base server string generation unit 110 generates a base server string according to the procedure shown in FIG. 3. FIG. 3 is a flow chart showing the generation of the base server string by the base server string generation unit 110. First, in a step S11, the server permutation generation unit 111 generates all server permutation having a length of the assumed simultaneous failure number "1". In this case, since the server 20 is at the maximum "4", when four servers A, B, C, and D are assumed, for the server A, B, C, and D, the server permutation [A], [B], [C], and [D] of length "1" are generated. In the following description, the server is represented by A, B, C, and D, the server permutation is represented by [A], [B], [C], and [D] with [ ].

In a step S12, the permutation connection graph generation unit 112 (see FIG. 2) generate a permutation connection graph 300 (see FIG. 4 and FIG. 5) to be used for generation of a base server string. The generation of the permutation connection graph 300 will be described later with reference to FIGS. 4 and 5.

In a step S13, the connection closed path extraction unit 113 (see FIG. 2) extracts an Euler closed path 400 (see FIG. 6) (connection clothed path) passing through all edges just once for the permutation connection graph generated by the permutation connection graph generation unit 112.

Figure 6:
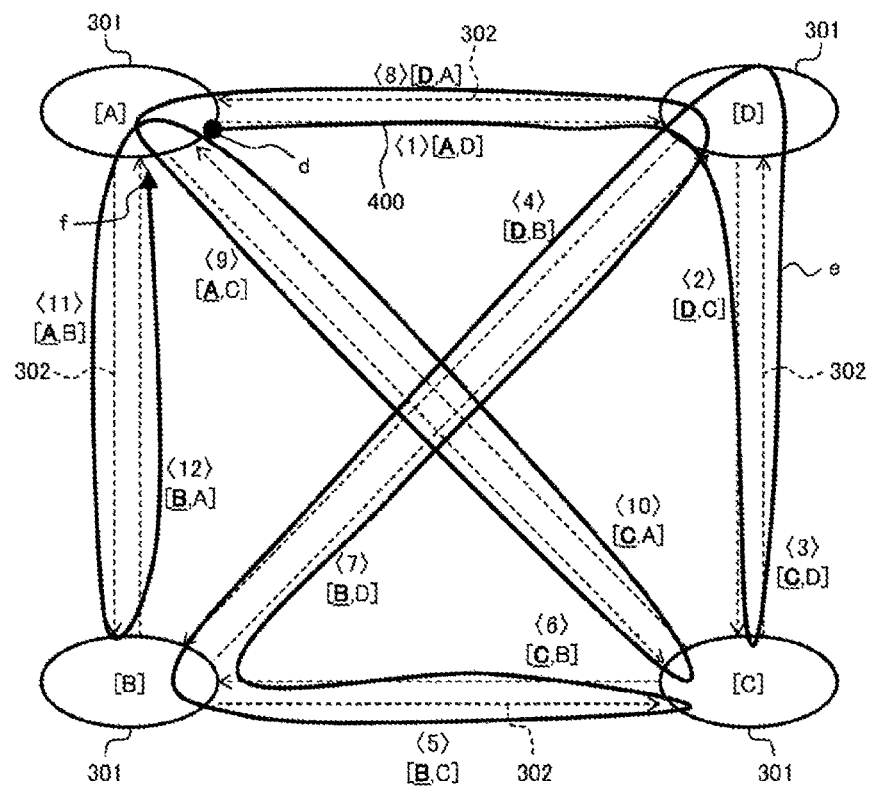
FIG. 6 is a diagram illustrating an example of an Euler closed path (connection closed path) on the permutation connection graph of the load balancing system according to the embodiment of the present invention.

The permutation connection graph obtained by the permutation connection graph generation unit 112 always has an Euler closed path 400 (connection closed path). Therefore, the connection closed path extraction unit 113 can extract the Euler closed path 400 by using a known algorithm such as a Fleuly algorithm without performing any particular preprocessing or the like. The Euler closed path 400 as shown in FIG. 6 is obtained from the permutation connection graph of FIG. 4, for example.

In a step S14, the server string extraction unit 114 (see FIG. 2) generates the server string in which servers located at the head of permutation corresponding to each node are arranged along an Euler closed path 400 (see FIG. 6) on the permutation connection graph 300 extracted by the connection closed path extraction unit 113. The server string generated along the Euler closed path 400 in FIG. 6 is [A, D, C, D, B, C, B, D, A, C, A, B]. The server string generated along the Euler closed path will be described later with reference to FIG. 6.

The generated server string [A, D, C, D, B, C, B, D, A, C, A, B] denotes a base server string output by the base server string generation unit 110. This base server string has a length of "12" and is easily held in the memory. In addition, the number of times of appearance of each server is uniform and load balancing performance is high.

Further, the whole permutation of the length of "the unit number of assumed failure servers (assumed simultaneous failure number)+1" is used for four servers, for example, when A fails, B takes over processing, and when A fails, C takes over processing, when any one server fails, the number of times of appearance of the remaining three servers is equal to four times. Therefore, distribution processing with high load balancing performance can be expected by distributing the base server string to the load balancing processing device 200.

Since the number of servers included in the generated base server string is "4", it is necessary to reduce the number of servers to "3" which is active. The update processing of the server string is born by the server string update unit 120 (will be described in <processing of the server string update unit 120>).

<Permutation Connection Graph>

FIGS. 4 and 5 show examples of the permutation connection graph 300 generated by the permutation connection graph generation unit 112. FIG. 4 is a diagram showing the permutation connection graph 300 in which one server permutation is included in a node, and FIG. 5 is a diagram showing the permutation connection graph 300 in which two server permutation are included in a node. The ellipses in FIGS. 4 and 5 represent nodes 301 of the permutation connection graph, and the broken line arrows connecting nodes 301 and 301 represent edges 302 of the permutation connection graph.

One server permutation among [A], [B], [C], [D] generated by the server permutation generation unit 111 is set in the node 301 of the permutation connection graph 300 shown in FIG. 4. The edge 302 is drawn when a condition to be described later is satisfied, and represents a partial permutation obtained by combining server permutations between the nodes 301. For example, the edge 302 connecting the server permutation [A] and the server permutation [B] of the node 301 in the permutation connection graph 300 shown in FIG. 4 is such that an edge 302 drawn from the server permutation [A] to the server permutation [B] of the node 301 is a partial permutation [A, B] shown in a symbol a in FIG. 4, the edge 302 drawn from the server permutation [B] to the server permutation [A] of the node 301 is a partial permutation [B, A] shown by a symbol b in FIG. 4. That is, the edge 302 set between different nodes 301 is a partial permutation obtained by combining each server permutation, and the arrangement (first and the last arrangements in permutation) of the combinations in the partial permutation are replaced according to the direction toward the node 301. Thus, edges are drawn bidirectionally between all nodes, and the permutation connection graph 300 as shown in FIG. 4 is obtained.

In the permutation connection graph 300 having two server permutations in the node shown in FIG. 5, the maximum number of servers is 4, and the permutation connection graph 300 of FIG. 4 and the maximum number of servers "4" are equal, but it is an example in the case where the assumed simultaneous failure number is "2".

The edge 302 of the permutation connection graph 300 having two server permutations in the node shown in FIG. 5 is more complicated than the permutation connection graph 300 having one server permutations in the node shown in FIG. 4.

The node 301 of the permutation connection graph 300 shown in FIG. 5 is provided with two server permutation [A, C], [C, B], [B, A], [C, D], [D, B], [A, D], [D, C], [B, D], [D, A], [A, B], [B, C], [C, A] generated by the server permutation generation unit 111 (see FIG. 2 and step S11 in FIG. 3).

The edge 302 indicated by broken line arrows in FIG. 5 is drawn when a condition to be described later is satisfied, and represents a partial permutation obtained by combining server permutation between nodes 301. The partial permutation obtained by combining the server permutation is as follows. That is, in the edge 302, the partial permutation for removing first one server (removing one server since the assumed simultaneous failure number is "1") of the server string of the node 301 coincides with the partial permutation for removing the last one server of the server permutation of another node, and the removed servers in each server string are set between different nodes.

For example, an edge 302 connecting the server permutation [A, C] and the server permutation [C, B] of the node 301 of the permutation connection graph 300 shown in FIG. 5 includes the server permutation [C, B] in which the server permutation [C] exists and the server permutation [B, A] in which the server permutation [A] exists viewing from the server permutation [A, C] of the node 301. In this case, for example, as shown in a symbol c of FIG. 5, the partial permutation in which the first server (here, server C) of the server permutation [C, B] is removed coincides with the partial permutation in which the last server (here, server C) of the server permutation [A, C] of another node 301 is removed, and an edge 302 drawn from the server permutation [A, C] to the server permutation [C, B] of the node 301 represents the partial permutation [A, C, B] of the edge 302 which connects the nodes 301 in the direction from the server permutation [A, C] to the server permutation [C, B]. That is, a partial permutation obtained by removing the first server C of the server permutation [C, B] is made to coincide with a partial permutation obtained by removing the last server C of the server permutation [A, C] of another node 301, the partial permutation of the edge 302 represents [A, C, B].

On the other hand, an edge 302 drawn from the server permutation [C, B] to the server permutation [A, C] are drawn so as to pass through the server permutation [B, D] and the server permutation [D, A] beyond that. Thus, the partial permutation in which the first server (here, server B) of the server permutation [B, D] is removed coincides with the partial permutation of the last server (here, server B) of the server permutation [C, B], and the edge 302 drawn from the server permutation [C, B] to the server permutation [B, D] represents the partial permutation [C, B, D] of the edge 302. By a similar procedure, an edge 302 drawn from the next server permutation [B, D] to the server permutation [D, A] is the partial permutation [B, D, A], and an edge 302 drawn from the next server permutation [D, A] to the server permutation [A, C] is the partial permutation [D, A, C].

The above is for the edge 302 connecting the server permutation [A, C] to the server permutation [C, B] of the node 301 of the permutation connection graph 300 and other server permutation is similar, an edge 302 connecting the server permutation [B, A], [C, D], [D, B], [A, D], [D, C], [B, D], [D, A], [A, B], [B, C], [C, A] of other nodes 301 represents the partial permutation by drawing an edge in the case where the partial permutation in which the first server of the server permutation is removed coincides with the partial permutation in which the last server of the server permutation of other node is removed.

In the present embodiment, since the permutation length of each node is "1", all partial permutation in which one server is removed from the front and rear of the server permutation coincide with each other in the empty server permutation [ ]. In this way, the edges 302 are drawn bidirectionally between all the nodes, and a permutation connection graph 300 as shown in FIG. 5 is obtained.

<<Server String Generated along the Euler Closed Path>>

FIG. 6 is a diagram showing an example of an Euler closed path (connection closed path) on the permutation connection graph 300 of FIG. 4.

Euler Closed Path Extraction

The connection closed path extraction unit 113 (see FIG. 2) extracts an Euler closed path 400 (see a thick arrow represented by one-stroke writing of FIG. 6) in which all edges 302 is passed once in the permutation connection graph 300 generated by the permutation connection graph generation unit 112 (see FIG. 2, step S12 of FIG. 3).

The permutation connection graph 300 generated by the permutation connection graph generation unit 112 always has an Euler closed path 400. Therefore, the connection closed path extraction unit 113 (see FIG. 2 and step S13 of FIG. 3) can extract an Euler closed path 400 (connection closed path) by using a known algorithm such as a Fleuly algorithm without performing special preprocessing or the like. From the permutation connection graph 300 shown in FIG. 4, an Euler closed path 400 shown in FIG. 6 is obtained, for example.

Server String Obtained Along the Euler Closed Path

The server string extraction unit 114 (see FIG. 2 and step S14 of FIG. 3) extracts (generates) a server string by arranging servers at the head of permutation corresponding to each edge along an Euler closed path 400 on the permutation connection graph 300. Although the "server string" is the same as the server permutation, the same server may appear repeatedly on the edge along the Euler closed path 400, so that the "server string" is modified.

In the permutation connection graph 300 shown in FIG. 6, the count of the edge 302 is "12", and the edge 302 is represented by bracket <1> to <12>. Together with the edge <1> to <12>, a partial permutation [ ] riding on the edge <1> to <12> is shown. For example, the partial permutation of the edge <1> connecting in the direction from the server permutation [A] to the server permutation [D] of the node 301 at the start point of the Euler closed path 400 is [A, D]. Then, the partial permutation of the edge <2> connected in one-stroke writing in the direction from the server permutation [D] to the server permutation [C] of the node 301 is [D, C], and the partial permutation of the edge <3> connected in one-stroke writing in the direction from the server permutation [C] to the server permutation [D] of the node 301 is [C, D]. Similarly, the partial permutation of the edge <12> connected in one-stroke writing in the direction from the server permutation [B] to the server permutation [A] of the node 301 is [B, A], and the edge <12> is the end point of the Euler closed path 400.

When a server riding on the edge <1> to <12> on the permutation connection graph 300 is viewed, since it is along the Euler closed path 400, one of the servers of each node 301 exists in each edge <1> to <12>. In other words, only the server at the determined position (for example, the first server) may be extracted from the partial permutation [ ] riding on the edge <1> to <12>. In this embodiment, as shown by bold characters and underlines in FIG. 6, only the first server among partial permutation [ ] is extracted as the server to be extracted. In the above example, the server [A] is extracted from the partial permutation [A, D] of the edge <1>, the server [D] is extracted from partial permutation [D, C] of the edge <2>, and the server [C] is extracted from the partial permutation [C, D] of the edge <3>. In this way, the server string obtained along the Euler closed path 400 is provided with [A, D, C, D, B, C, B, D, A, C, A, B].

Server string [A, D, C, D, B, C, B, D, A, C, A, B] denotes a base server string output by the base server string generation unit 110. Since the base server string is short as long as "12", it is easy to hold the base server string in the memory. In addition, the number of times of appearance of each server is uniform, load balancing performance is high, and even if any one server fails, the number of times of appearance of the remaining three servers is uniform four times each. Therefore, distribution processing with high load balancing performance can be expected by distributing the base server string to the load balancing processing device 200.

The server string obtained along the Euler closed path 400 has been described above. Next, the update processing of the server string will be described.

<Processing of the Server String Update Unit 120>

Figure 7:
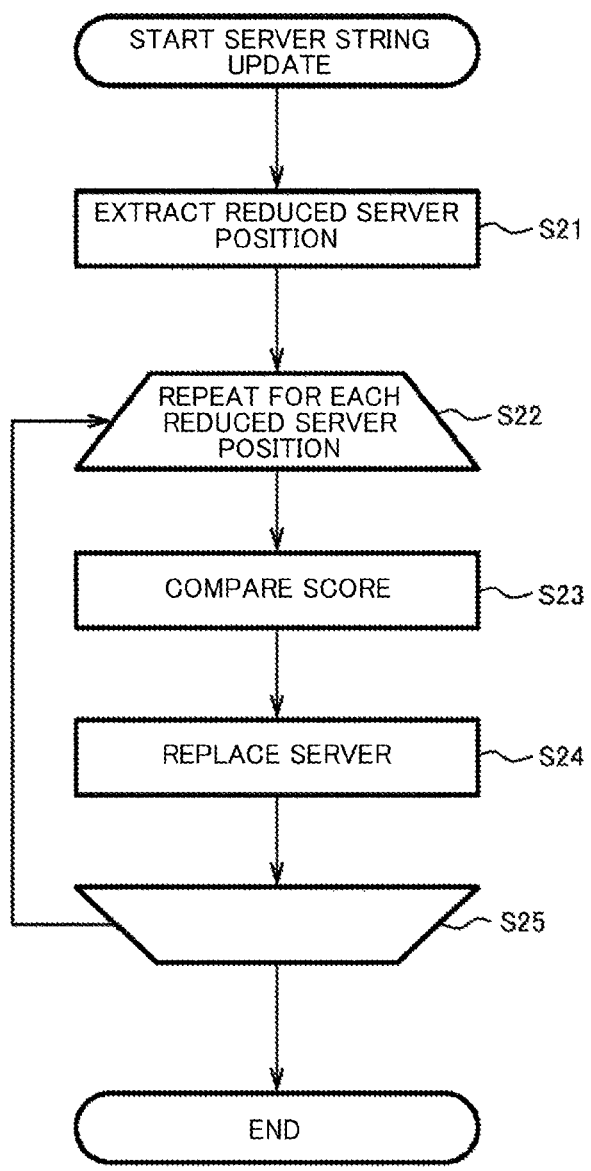
FIG. 7 is a flowchart showing an update of the server string of a server string update unit of the load balancing system according to the embodiment of the present invention.

FIG. 7 is a flowchart illustrating update of server string in the server string update unit 120.

As described above, the number of servers included in the generated base server string is "4". An example of the update processing in which the number of active servers is reduced to "3" is described.

In the case where there is a plurality of servers to be reduced, the update processing of the server string is performed one by one, and the procedure of the flow of FIG. 7 is repeated.

First, in a step S21, the server string update unit 120 (see FIG. 1) searches for a server to be reduced from the server string to be updated, and extracts the position thereof.

The server string update unit 120 repeats processing of a step S23 and S24 for each extracted reduced server position between the loop start point of the step S22 and the loop end point of the step S25.

As described above, the base server string generation unit 110 outputs the server string [A, D, C, D, B, C, B, D, A, C, A, B] (see FIG. 6).

In the present embodiment, when the server to be reduced is D from the server string [A, D, C, D, B, C, B, D, A, C, A, B], three positions of server D of second, fourth, and eighth in the server string [A, D, C, D, B, C, B, D, A, C, A, B] are extracted as update target positions, and subsequent processing for each position will be executed.

In a step S23, the server string update unit 120 performs score comparison. Specifically, the server string update unit 120 searches for a server that satisfies a constraint among active servers and minimizes a score for an update target position to replace to the server (Step S24). The constraint is newly generated by replace and is that a partial string of the length of the assumed simultaneous failure number+1 is also a permutation. In this embodiment, the assumed simultaneous failure number in the server 20 (see FIG. 1) is "1". Therefore, the above-mentioned constraint is that a partial string of a length of "2", which is the length of the assumed simultaneous failure number+1, is also a permutation. In other words, the server of the replacement destination cannot select the first server before and after the replacement position.

With respect to the position of the second server D of the server string [A, D, C, D, B, C, B, D, A, C, A, B] of the present embodiment, A, C exist before and after. Thus, since only the server satisfying the constraint is B, the replacement destination is automatically determined as the server B.

The following score function is a deviation of the number of times of appearance of the permutation of length "2" appearing in the server string, and the smaller the score, the more the load balancing performance is improved.

As for the score function, the number of partial permutations having a shorter length may also be considered depending on the policy of the system operator. When this processing is performed for all the positions extracted by a reduced server position extraction unit 121, the server string is updated to [A, B, C, A, B, C, B, C, A, C, A, B], and the update of the server string is completed.

Examples of score functions are described. The score function is represented by the equation (1).

[Math. 1]

$$\sum_{p \in P_i} \left| num(s, p) - \frac{1}{|P_i|} \right| \quad (1)$$

i represents the length of permutation, Pi represents the set of permutation of length i, l represents the length of the server string, and s, p represent the parameter of the argument initialized by the default value of the function. Thus, a server string is generated when the maximum number of servers is "4" and the number of active servers is "3".

The generated server string is updated by the server string update unit 120 (see FIG. 1). For example, when the orchestrator 30 (see FIG. 1) notifies that the number of active servers is further decreased, the server string update unit 120 performs update processing of FIG. 7. Similarly, when the number of servers is increased, the server string can be updated. The server string holding unit 130 relates to the increase of the servers, and the following description will be given.

<Processing of Server String Holding Unit 130>

A server string holding unit 130 receives and holds the server string before update when the server string update unit 120 updates the server string. When the number of servers increases within a range equal to or less than the maximum number of servers, among the server strings stored in the server string holding unit 130, a server string having the same active number of servers is called and used. The server string holding unit 130 basically has the form of LI-FO (Last In First Out), which are output in order from the last stored server string.

For example, when D is reduced from a server string [A, D, C, D, B, C, B, D, A, C, A, B], the server string is updated to [A, B, C, A, B, C, B, C, A, C, A, B], [A, D, C, D, B, C, B, D A, C, A, B] before update is held in the server string holding unit 130. Thereafter, when the number of servers is returned to "4", the server name to be added is defined as D, the server string is updated again to [A, D, C, D, B, C, B, D, A, C, A, B] held in the server string holding unit 130.

Here, when it is necessary to add more servers than the maximum number of servers, the server string update unit 120 does not use the server string holding unit 130, determines a slot to be allocated to a new server in a search manner while minimizing the score function, and can update the server string. In this case, since the length of the server string is less than the number of permutations, permutations that do not appear in the server string always appears, and load balancing is not ideal. Still, it is possible to execute server extension while maintaining consistency while suppressing load deviation within a possible range.

As described above, since the server string exhibiting high load balancing performance can be generated with a small memory capacity, the expected load balancing processing can be executed by distributing the server string to the load balancing processing device 200.

[Processing of Load Balancing Processing Device 200]

Next, the processing of the load balancing processing device 200 will be described.

The load balancing processing device 200 (see FIG. 1) needs to receive and hold the server string [A, B, A, C, B, C] (see FIG. 4) from the server string management device 100 in advance of the distribution operation. The length of the server string [A, B, A, C, B, C] is not limited to this, and each server is allowed to appear plural times in one server string.

When receiving the DB operation request, in the load balancing processing device 200, the distribution unit 210 (see FIG. 1) extracts the key of the operation object record, and transmits the key to the distribution destination determination unit 220.

The distribution destination determination unit 220 (see FIG. 1) calculates the hash value of the received key within a range of the length of the server string or less. In this case, since the server string is [A, B, A, C, B, C], any integer value of 1 to 6 is calculated at random, but the same hash value is calculated for the same key. For example, when the hash value is calculated to be 3, the distribution destination determination unit 220 determines that A which is third in the server string as a distribution destination server, and returns it to the distribution unit 210. The distribution unit 210 which has received the return distributes the distribution object such as the DB operation request to the server 20 according to the return.

When the server A fails before the distribution processing, the failure detection unit 230 detects the failure, and the server string replacement unit 240 immediately updates the server string, so that the distribution destination determination unit 220 can determine another distribution destination server 20.

The failure detection unit 230 (see FIG. 1) detect a failure of the server 20 by periodically performing communication for operation confirmation to each server 20 or monitoring a response to a DB operation request. When a failure is detected, the failure detection unit 230 immediately notifies the server string replacement unit 240 of the server failure.

When receiving the failure notification, the server string replacement unit 240 replaces each of the failure servers in the server string with a normal server which comes to the first place among the following servers.

In this example, the server string [A, B, A, C, B, C] is updated to [B, B, C, C, B, C] according to the failure of A, and transmitted to the distribution destination determination unit 220.

When the server 20 is restored from the failure, the server string replacement unit 240 holds the server string before update in order to return the server string to the original server string.

The server string replacement unit 240 may be replaced by the distribution destination determination unit 220 as follows. That is, when the distribution destination determination unit 220 is notified of the server failure from the failure detection unit 230, the distribution destination determination unit 220 does not update the server string but holds a list of failed servers 20. Then, when calculating the hash value and referring to the server string, the server 20 not included in the failure list is searched in order from the position indicated by the hash value, thereby obtaining the same effect as that of the server string replacement unit 240. In the above example, when the hash value is 3 and the failure server 20 is only A, the third A of the string [A, B, A, C, B, C] is in the failure list, the next fourth C is determined as the distribution destination.

As described above, after the server string is determined, the load balancing processing device 200 can distribute the distribution objects such as the DB operation request including the failure of the server 20.

The load balancing performance and the memory usage of the distribution processing depend on the uniformity and length of the server string, respectively. Therefore, the server string management device 100 appropriately generates and updates the server string.

[Hardware Configuration]

Figure 8:
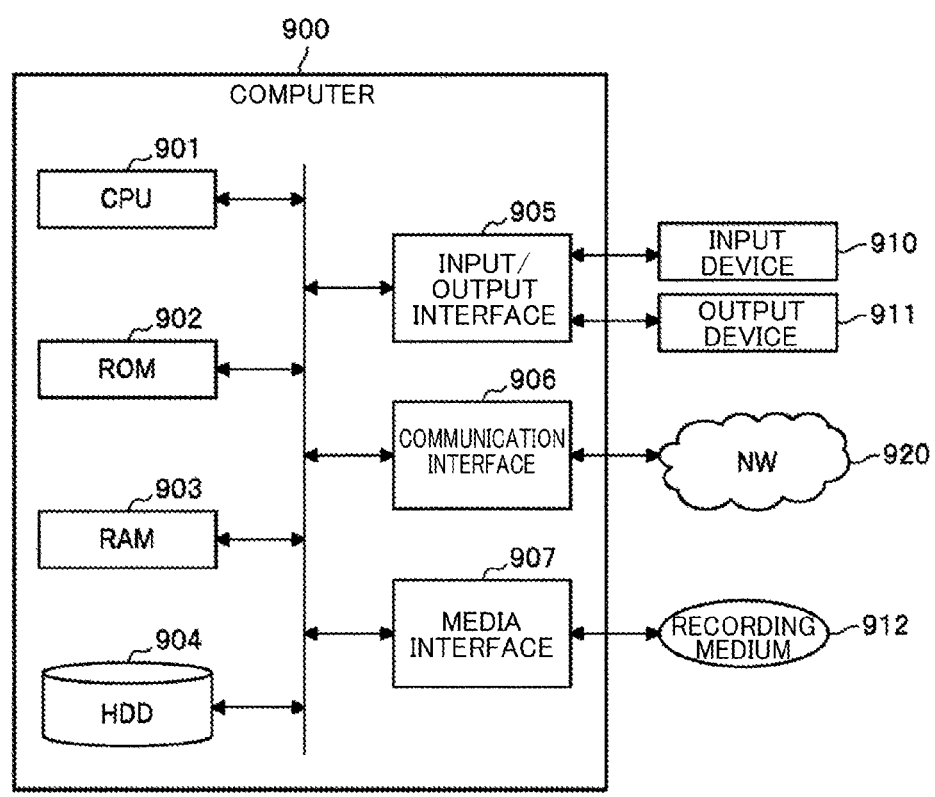
FIG. 8 is a hardware configuration diagram showing an example of a computer that realizes functions of the load balancing method according to the embodiment of the present invention.

The load balancing method according to the present embodiment is realized by, for example, a computer 900 which is a physical device and having a configuration as shown in FIG. 8. FIG. 8 is a hardware configuration diagram showing an example of a computer that realizes functions of the load balancing method according to the embodiment of the present invention. The computer 900 includes a CPU (Central Processing Unit) 901, a ROM (Read Only Memory) 902, a RAM 903, an HDD (Hard Disk Drive) 904, an input/output interface 905, a communication interface 906, and a media interface 907.

The CPU 901 operates on the basis of a program stored in the ROM 902 or the HDD 904 and performs control by the control unit of the server string management device 100 shown in FIG. 1. The ROM 902 stores a boot program executed by the CPU 901 when the computer 900 is started, a program related to the hardware of the computer 900, and the like.

The CPU 901 controls an input device 910 such as a mouse and a keyboard and an output device 911 such as a display via the input/output interface 905. The CPU 901 acquires data from the input device 910 and outputs generated data to the output device 911 via the input/output interface 905. A GPU (Graphics Processing Unit) or the like may be used as the processor together with the CPU 901.

The HDD 904 stores programs executed by the CPU 901, data used by the programs, and the like. The communication interface 906 receives data from other devices via a communication network (for example, NW (Network) 920), outputs the data to the CPU 901, and transmits data generated by the CPU 901 to other devices via the communication network.

The media interface 907 reads a program or data stored in a recording medium 912 and outputs the data to the CPU 901 via the RAM 903. The CPU 901 loads the program from the recording medium 912 on the RAM 903 via the media interface 907 and executes the loaded program. The recording medium 912 is an optical recording medium such as DVD (Digital Versatile Disc), PD (Phase change rewritable Disk), a magneto-optical recording medium such as MO (Magneto Optical disk), a magnetic recording medium, a conductor memory tape medium, a semiconductor memory, or the like.

For example, when the computer 900 serves as the server string management device 100 according to the present embodiment, the CPU 901 of the computer 900 realizes the function of the server string management device 100 by executing the loaded program on the RAM 903. Data in the RAM 903 are stored in the HDD 904. The CPU 901 reads the program related to the target processing from the recording medium 912 and executes the program. In addition, the CPU 901 may read a program related to the target processing from another device via the communication network (NW920).

[Effect]

The effects of the load balancing method and the like according to the present invention will be described below. In the load balancing method according to the present invention, a load balancing device (server string management device 100) (see FIG. 1) executes, to the server for load balancing, a server permutation generation step (see S11 of FIG. 3) of generating a server permutation combination indicating a combination of servers in a predetermined constraint, a permutation connection graph generation step (see S12 of FIG. 3) of generating a permutation connection graph connecting the generated server permutation combination as a node, a connection closed path extraction step (S13 of FIG. 3) of extracting an Euler closed path passing all the edges once with drawing an edge connecting nodes on the generated permutation connection graph, and a server string extraction step (S14 of FIG. 3) of generating a server string in which servers located at predetermined positions corresponding to the respective nodes are arranged along the generated Euler closed path.

Thus, the present invention can generate a server string with a low memory usage. Thus, a system having no deviation of loads between servers can be constructed with a low memory usage. Consequently, the load between the servers can be made more uniform while suppressing the influence when the server resources are increased or decreased, and the request performance of each server can be lowered.

Further, the predetermined constraints can be made to be a permutation of a partial string having a length obtained by adding 1 to the unit number of assumed simultaneous failure number.

Thus, the server string can be permuted even for the partial string having the length of the assumed simultaneous failure number+1, and the smaller the score which is the deviation of the appearance frequency of the permutation of the length appearing in the server string in the score function, the more the load balancing performance is improved.

In addition, when the number of servers is increased or decreased within the assumed simultaneous failure number, the assumed simultaneous failure number+1 is set, so that the place of the server string which does not satisfy the length of the assumed simultaneous failure number+1, that is, has no influence is not changed. Thus, the amount of movement of the stored data can be reduced as much as possible.

The load balancing system 1 according to the present invention includes the load balancing device, and the distribution device (the distribution unit 210 of FIG. 1) which divides a predetermined hash space into slots having a length of a generated server string, generates slot groups in which servers are allocated to each of the divided slots in the order shown in the server string, and distributes the received packets by using the generated slot groups.

Thus, the range of the key to be distribution target is uniformly divided between the servers, and the slot groups having fault tolerance which is the characteristic of the consistent hash method, that is, in which the load is uniform even when some servers are failed can be generated with high memory efficiency. Thus, the system having no deviation of loads between servers can be constructed with a low memory usage.

[Others]

Of the various processing described in the present embodiment, all or part of the processing described as being performed automatically can be entirely or partially performed manually, or, alternatively, can also be entirely or partially performed automatically by a known method. Furthermore, information including processing procedures, control procedures, specific names, and various types of data and parameters set forth in the description and drawings given above can be arbitrarily changed unless otherwise specified.

Furthermore, the constituent components of the shown devices are based on the functional concept and are not necessarily required to have a physical configuration as shown in the drawings. In other words, the specific aspects of distribution and integration of the devices are not limited to those illustrated in the drawings, all or part of the components may be distributed or integrated functionally or physically in desired units depending on various kinds of loads and states of use.

Further, a part or all of the respective configurations, functions, processing units, processing methods and the like may be realized by hardware, for example, by designing it by an integrated circuit. Further, the above-mentioned configurations, functions, or the like may be realized by software for interpreting and executing programs for realizing the respective functions by the processor. Information such as a program, a table, a file for realizing each function is stored in a recording device such as a memory, a hard disk, an SSD (Solid State Drive), or a recording medium such as an IC (Integrated Circuit) card, an SD (Secure Digital) card, or an optical disk. In addition, in the present specification, the processing step for describing the time-series processing is performed not only in the time-series manner along the described order but also in the case where the processing is not necessarily performed in the time-series manner, in parallel manner or individually (for example, parallel processing or processing by an object).

REFERENCE SIGNS LIST

1 Load balancing system
10 Client
20 Server
30 Orchestrator
100 Server string management device (load balancing device)
110 Base server string generation unit
111 Server permutation generation unit
112 Permutation connection graph generation unit
113 Connection closed path extraction unit
114 Server string extraction unit
120 Server string update unit
130 Server string holding unit
200 Load balancing processing device
210 Distribution unit (Distribution device)
220 Distribution destination determination unit
230 Failure detection unit
240 Server string replacement unit
300 Permutation connection graph
301 Node
302 Edge
400 Euler closed path

The invention claimed is:

1. A load balancing method of a load balancing device, in which load balancing is performed among a plurality of servers, the load balancing method comprising:
   generating a server permutation combination indicating a combination of servers in a predetermined constraint for a load balancing server;
   generating a permutation connection graph in which the generated server permutation combination is connected as a node;
   extracting an Euler closed path passing through all edges once with drawing an edge which passes a path connecting each node on the generated permutation connection graph; and
   generating a server string in which servers at predetermined positions corresponding to the respective nodes are arranged along the extracted Euler closed path.

2. The load balancing method according to claim 1, wherein the predetermined constraint is that a partial string having a length obtained by adding 1 to a unit number of an assumed simultaneous failure number is a permutation.

3. A load balancing device configured to perform load balancing among a plurality of servers, the load balancing device comprising one or more processors configured to:
   generate a server permutation combination indicating a combination of servers in a predetermined constraint for a load balancing server;
   generate a permutation connection graph in which the generated server permutation combination is connected as a node,
   extract an Euler closed-circuit passing through all edges once with drawing an edge which passes a path connecting each node on the generated permutation connection graph; and
   generate a server string in which servers at predetermined positions corresponding to the respective nodes are arranged along the extracted Euler closed-circuit.

4. The load balancing device according to claim 3, wherein the predetermined constraint is that a partial string having a length obtained by adding 1 to a unit number of an assumed simultaneous failure number is a permutation.

5. A load balancing system in which a load balancing device is configured to perform load balancing among a plurality of servers and a distribution device is configured to distribute received packets are provided, wherein
   the load balancing device comprising one or more processors configured to:
      generate a server permutation combination in a predetermined constraint for a load balancing server;
      generate a permutation connection graph in which the generated server permutation combination is connected as a node;
      extract an Euler closed path passing through all edges once with drawing an edge which passes a path connecting each node on the generated permutation connection graph; and
      generate the server string in which servers located at predetermined positions corresponding to the respective nodes are arranged along the extracted Euler closed path; and the distribution device comprising one or more processors configured to:
- divide a predetermined hash space into slots having a length of the generated server string;
- generate a slot group in which the servers are allocated to each of the divided slots in an order indicated by the server string distributed from the load balancing device; and
- perform the distribution of the received packets.

6. A program causing a computer to execute the load balancing method according to claim 1.

7. The load balancing system according to claim 5, wherein the predetermined constraint is that a partial string having a length obtained by adding 1 to a unit number of an assumed simultaneous failure number is a permutation.

* * * * *